Sept. 29, 1959 E. J. LAWTON 2,906,679
IRRADIATED POLYETHYLENE
Filed April 11, 1955
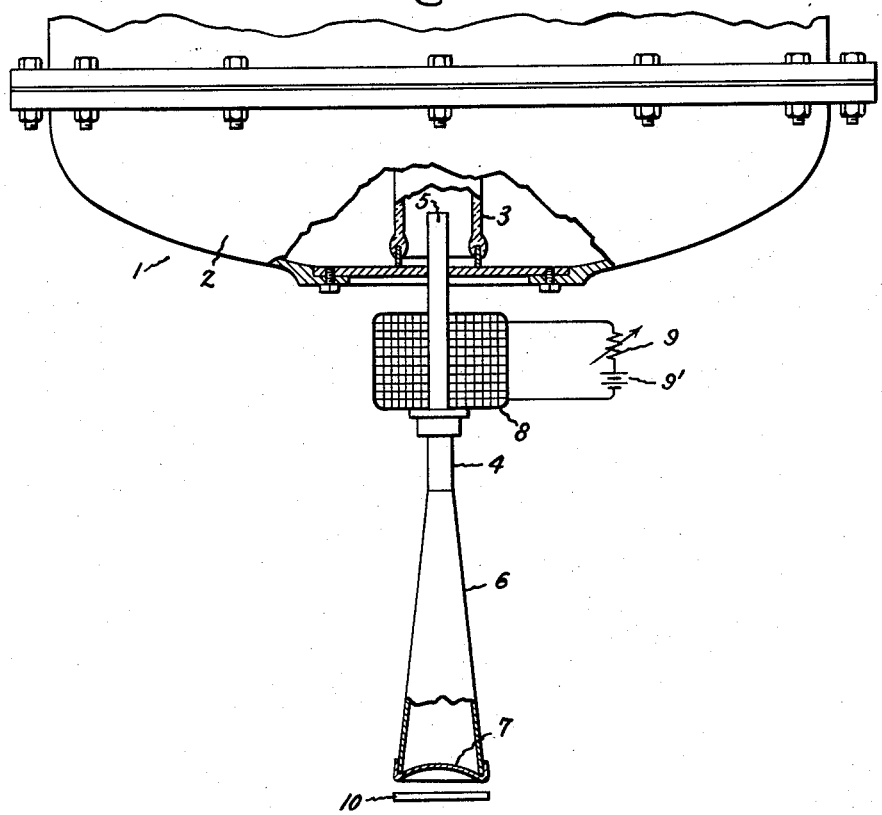
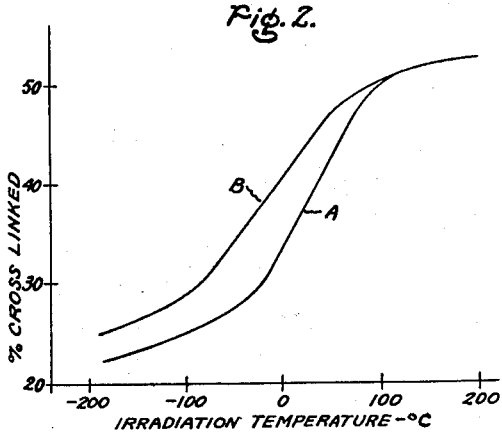
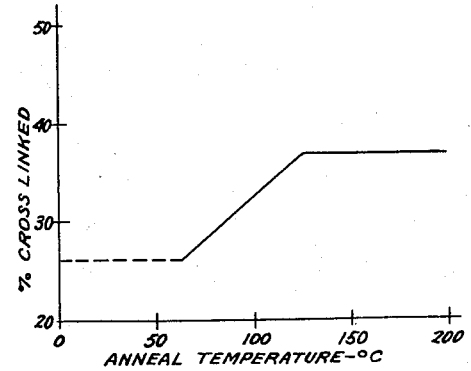
Inventor:
Elliott J. Lawton,
by Paul A. Frank
His Attorney.

United States Patent Office 2,906,679
Patented Sept. 29, 1959

2,906,679
IRRADIATED POLYETHYLENE

Elliott J. Lawton, Schenectady, N.Y., assignor to General Electric Company, a corporation of New York Application April 11, 1955, Serial No. 500,510

13 Claims. (Cl. 204—154)

This invention relates to methods of obtaining polyethylene in a modified physical state at those temperatures at which polyethylene is normally in a different physical state (hereafter referred to as modified polyethylene). More particularly, this invention relates to a method of increasing the cross-link efficiency of high energy irradiation which comprises irradiating polyethylene of a modified physical state at those temperatures at which polyethylene is normally in a different physical state. This invention also relates to the products of this process.

In the gamut of polymeric materials which have evolved in recent years, polyethylene has proved to be one of the most popular. It has found wide usage as an insulating material, as a container material, as conduit material, etc. Fabrication, molding, extrusion and calendering of polyethylene are readily accomplished by standard methods, thus facilitating its use for many purposes. Despite all this, however, the applications of polyethylene are greatly limited by its lack of "form stability," i.e., the ability to retain a particular shape at elevated temperatures and by its solubility in solvents.

In the copending application of Elliott J. Lawton and Arthur M. Bueche, Serial No. 324,552, filed December 6, 1952, and assigned to the same assignee as the present invention, there are disclosed and claimed polyethylene compositions irradiated with high energy electrons to obtain new products having at elevated temperatures markedly improved form stability, increased solvent resistance, and stress cracking properties. In accordance with the invention described and claimed in the aforesaid Lawton and Bueche application, high energy electrons obtained from high voltage accelerating apparatus are allowed to impinge upon preformed polyethylene shapes, such as tapes, sheets, various containers and bottles, etc., whereby as a result of such treatment to a radiation dose in the range of $3 \times 10^6$ to $5 \times 10^8$ REP the irradiated polyethylene is able to better withstand higher temperatures and the effects of many solvents than is possible for the unirradiated polyethylene.

In another copending application of Elliott J. Lawton and Arthur M. Bueche, Serial No. 500,509, filed of even date with the instant application and assigned to the same assignee, there is described a method of increasing the cross-linking efficiency without a corresponding increase in irradiation-produced trans-unsaturation

by irradiating polyethylene at elevated temperatures. Therein, it was demonstrated that while the cross-linking efficiency of an irradiation dose was increased at elevated temperatures, the degree of irradiation-produced trans-unsaturation was dependent on total dose and substantially independent of temperature. By this process a more stable cross-linked polyethylene was produced, possessing a lower ratio of trans-unsaturation to cross-links than was possible with room temperature irradiation.

I have now discovered that by irradiating modified polyethylene within the temperature range at which polyethylene is normally in a different physical state the cross-linking efficiency of high energy irradiation is increased beyond that caused by temperature alone. Modified polyethylene is polyethylene so treated that it is in a different physical state from normal polyethylene (i.e., polyethylene which has attained an equilibrium in its physical state) at the corresponding temperature. One method of producing modified polyethylene comprises heating polyethylene above the temperature at which it is to be irradiated, preferably about 110° C. or above, and then allowing the heated polyethylene to cool to the temperature at which it is to be irradiated. Another method of producing modified polyethylene comprises (1) heating polyethylene to a temperature at which it is amorphous, preferably about 110° C. or above, (2) cooling to below a temperature at which further molecular ordering is reduced to a minimum, below about −45° C., (3) warming the polyethylene to the temperature at which it is to be irradiated within the temperature range at which polyethylene is normally in a different physical state. The significance of this discovery is that the cross-linking effectiveness of a certain dose is further increased beyond that expected from temperature change alone, thus further reducing the cost of producing a cross-linked polyethylene that should possess a low ratio of trans-unsaturation to cross-links. As of present knowledge, the reason for the enhanced cross-linking effect is not completely understood. Although I do not wish to be bound by this theory, it is believed to be due to a modified or reduced crystalline state.

The polyethylene referred to herein is a polymeric material formed by the polymerization of ethylene at low and high temperatures and pressures. It is described in Patent 2,153,553, Fawcett et al., and in "Modern Plastics Encyclopedia," New York, 1949, pages 268–271. Specific examples of commercially available polyethylene is the polyethylene sold by E. I. du Pont de Nemours & Co., Inc., Wilmington, Delaware, examples of which are "Alathons 1, 3, 10, 12, 19, etc."; those sold by the Bakelite Company, such as DE-2400, DYNH, etc., and the Phillips Petroleum Company polymers, such as Marlex 20, 50, etc. Other polyethylenes of various molecular weights are disclosed in Lawton et al., "Industrial & Engineering Chemistry" 46, pages 1703–1709 (1954).

When crystalline-type high polymers, such as polyethylene, are cooled, they tend to form micro crystals which impart opacity to the solid polymer. The spherical outlines of these crystals and their attached amorphous regions which can range from submicroscopic regions to regions which are readily visible under the microscope are known as spherulites. Although total crystallinity should be theoretically possible, in practice total crystallinity even at very low temperatures appears to be prevented by some branching in the polyethylene chain. While the degree of crystallinity varies with temperature and the specific polyethylene employed, the crystalline content of translucent electrical grade polyethylene is about 75% at room temperature.

As the temperature of polyethylene is raised, the change from a crystalline to an amorphous state occurs at temperatures which are below those generally taken as the polymer's flow point. Although this transition of structure extends over a range, the commercial polymer is substantially amorphous at about 110–110° C. Above this temperature, which is called the crystal melting point (hereafter designated at $T_m$), molecular order is substantially destroyed and the material becomes completely amorphous. If the temperature is slowly lowered below $T_m$, crystallinity increases until the glass or brittle temperature is reached at —45 to —60° C. (hereafter called $T_g$) below which further molecular ordering is reduced to a minimum.

The invention may best be understood by reference to the following description taken in conjunction with the drawings.

In Fig. 1 there is shown high voltage accelerating apparatus 1 capable of producing a beam of high energy electrons for irradiating polymeric materials in accordance with the invention. High voltage accelerating apparatus 1 may be of the type disclosed in Patent 2,144,518, Westendorp. In general this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the afore-mentioned Westendorp patent and in "Electronics," vol. 17, pages 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing the form stable and solvent resistant materials according to the invention, a sheet 10 of modified polyethylene can be supported in the path of the electrons emerging from end-window 7 as illustrated. The high energy electrons penetrate the polymeric materials to a depth dependent upon their energy and effect the above modifications in the properties of the material. Of course, sheet 10 can be in the form of strip material which is passed continuously under end-window 7 at a velocity selected to give the desired irradiation dosage. Other expedients for obtaining the irradiation of the polymeric materials in various shapes (e.g., bottles, cups, tubing, thread, etc.) will be apparent to those skilled in the art. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton, or xenon, etc., to prevent the effect of any corona which may be present.

In application, Serial No. 500,509, there are described swelling and solubility methods of evaluating the degree of cross-linking produced in polyethylene by high energy irradiation which methods can be used in evaluating cross-linking produced by the method of the present invention.

Although uncross-linked polyethylene will totally dissolve in solvents, polyethylene which has been sufficiently cross-linked by irradiation will swell when in contact with these solvents. The degree of cross-linking present in these polyethylene samples which had been irradiated at a certain temperature can be evaluated by the amount of volume swelling which occurred when these samples were placed in contact with certain solvents. Since resistance of polymeric materials to solvents is a measure of cross-linking, a convenient method of measuring cross-linking efficiency is by the comparison of the volume of the irradiated polyethylene sample before immersion in a swelling solvent ($v_0$) to the volume of the irradiated sample after immersion ($v$), i.e., $v/v_0$. To eliminate any effect of degree of crystallinity, the measurements are made at 90° C. in toluene for at this temperature crystallinity is greatly minimized. If the samples are initially all the same size $v/v_0$ should be a direct indication of the amount of swelling of the samples in the solvent. Toluene and other aromatic or substituted aromatic compounds, such as xylene, mesitylene, nitrobenzene, benzene (under pressure), etc., or mixtures of such compounds, are solvents for polyethylene and the use of the word "solvents" herein refers to such compounds or compound mixtures. Since irradiation greatly enhances the solvent resistance of polyethylene, irradiation reduces the amount of swelling of polyethylene in a "swelling agent."

Solubility measurements as a measure of percentage of cross-linking are based on the phenomenon that when polyethylene is subjected to irradiation, a principal effect is the formation of cross-links. At some minimum dose, the number of cross-links is sufficient to form gel particles insoluble in such solvents for polyethylene as hot toluene while at higher doses the polymer is sufficiently gelled to resist disintegration in a hot solvent but still yields on swelling some solvent extractable materials.

The effect of irradiation on solubility measurements is determined as follows: A weighed piece of irradiated polyethylene, which could have, for example, the following measurements, .002 inch thickness x 1.25 inch diameter, is immersed in a solvent for polyethylene, such as toluene, for example, about 1000 ml., and heated under reflux for 2½ hours or more to insure substantially complete extraction. The test piece was then removed from the solvent and dried to constant weight under reduced pressure. Percent weight loss is equal to $$\frac{\text{(Initial weight)} - \text{(final weight)}}{\text{Initial weight}} \times 100$$

which value is proportional to percent cross-linking. The changes due to the irradiation as determined from solubility measurements are in close accord with the results obtained from volume swelling measurements, i.e., as the percent of cross-linked material increases, the swelling ratio decreases.

High energy irradiation of polyethylene causes the liberation of a mixture of gases of which hydrogen is the chief constituent. The presence of hydrogen gas indicates that hydrogen atoms removed by ionizing irradiation combine to form hydrogen molecules. If the points of hydrogen removal are on different molecules of polyethylene, cross-linking occurs, but if hydrogens are removed from adjacent carbons on the same polyethylene molecules, trans-unsaturation

takes place. The amount of this trans-unsaturation in the polymer produced by irradiation is determined by changes in the absorption in the infrared absorption peak 10.35$\mu$. In Lawton et al., "Journal American Chemical Society" 76, pages 3437–3439 (1954), it is shown that at a constant temperature using this type of irradiation trans-unsaturation increases with increasing irradiation. In view of the fact that more cross-links are formed by the high energy irradiation of modified than from normal polyethylene, less trans-unsaturation should result.

The invention will be better understood by reference to the following illustrative examples. These examples are cited as illustrative and are not intended for purposes of limitation.

EXAMPLE 1

A 2-mil film of polyethylene having a molecular weight of 21,000 was heated (hereafter called annealed) at 150° C. so as to destroy its crystallinity. This annealed polyethylene was cooled as quickly as possible (within 1-2 minutes) to the temperature at which it was irradiated. This process was repeated at various irradiation temperatures and the samples of annealed polymer were irradiated ($7.8 \times 10^6$ R.) over the temperature range shown in Fig. 2.

Results of the comparative measurements are shown in Fig. 2 which presents percent of cross-linked material (the ordinate) as a function of temperature during irradiation (the abscissa) for both the normal polyethylene (curve A) and modified polyethylene (curve B). The source of normal polyethylene (A) was the same sheet as that used in curve B except that A had remained at room temperature for many years. The radiation dose, which was held constant at $7.8 \times 10^6$ R. for each temperature determination, was obtained from an 800 kilovolt (peak) (kvp.) resonant transformer cathode ray unit. A Roentgen unit (R.), as usually defined, is the amount of radiation that produces one electrostatic unit of charge per milliliter of dry air under standard conditions and, as employed here, refers to the amount of electron radiation measured with an air equivalent ionization chamber at the position of the upper surfaces of the polymeric material. The percent of cross-linked material was determined by solubility measurement. The changes due to the irradiation as determined by these measurements checked closely with the results obtained from volume swelling measurements. Since there is a greater amount of cross-linking in irradiated, modified polyethylene than in irradiated, normal polyethylene, the former should have a lower ratio of trans-unsaturation to cross-linking than the latter.

EXAMPLE 2

A 2-mil film of polyethylene having a molecular weight of 21,000 was annealed at 150° C. so as to destroy crystallinity. This heated polyethylene was quickly cooled below $T_g$ by quenching in liquid nitrogen. This material will remain in this modified state as long as the temperature is held below $T_g$. Appreciable time is required for any reversion from the modified to the normal state when warmed rapidly (1-2 minutes) to a given temperature above $T_g$. Polyethylene subjected to this temperature cycle was irradiated ($7.8 \times 10^6$ R.) at given temperatures over the temperature range shown in Fig. 2. The curve produced from this data was substantially the same as the B curve in Fig. 2.

Since $T_m$ is about 110° C. and $T_g$ is below about −45° C., it is obvious that any temperature above $T_m$ and any temperature below $T_g$ can be used in the above process instead of the temperatures used in Example 2.

The effect of anneal temperature was determined in the following manner:

EXAMPLE 3

A 2-mil film of polyethylene having a molecular weight of 21,000 was annealed at various temperatures followed by a fast cold quench in liquid nitrogen. Thereupon, after being warmed to −40° C., the polymer was subjected to an irradiation dose of $7.8 \times 10^6$ R. obtained from an 800 kvp. transformer. The results are presented in Fig. 3.

In Fig. 3 there is shown a graph wherein the abscissa represents the anneal temperature (° C.) and the ordinate represents the percent of cross-linked polyethylene as determined by solubility measurements. The quench temperature (liquid nitrogen), the irradiation temperature (−40° C.), and the dose ($7.8 \times 10^6$ R.) were all constants.

As a control one sample which was subjected to similar irradiation at −40° C. without prior annealing or quenching yielded polyethylene which was 26% cross-linked. From this curve it is apparent that the effect of anneal temperature on cross-linking was substantially constant when the anneal temperature was 125° C. or higher. Where the anneal temperature was lowered from 125 to 60° C. cross-linking effectiveness was gradually reduced, but was substantially higher than the control sample that had not been annealed. However, when the anneal temperature was less than 60° C., no greater cross-linking was achieved than when polyethylene was irradiated at −40° C. without being annealed.

The effect of annealing, cold quench and "dwell time" (i.e., the time prior to irradiation that the polymer remains at the temperature at which it is to be irradiated) was determined by the following examples:

A series of 2-mil samples of polyethylene having a molecular weight of 21,000 was annealed at either 110° or 150° C. In some examples the annealed polymer was quenched, in others it was not. After being annealed or annealed and quenched, the polymer was given various "dwell times" prior to being subjected to an irradiation dose of $7.8 \times 10^6$ R. obtained from an 800 kvp. transformer. The percent of cross-linking was determined by solubility measurements. These results are presented in Table I.

*Table I*

| Example | Anneal temp., °C. | Quench in liquid nitrogen | Dwell temp. and temp. at which irradiated, °C. | Percent cross-linked material | | | |
|---|---|---|---|---|---|---|---|
| | | | | 1 min. dwell time | 2 hr. dwell time | 6 hr. dwell time | 24 hr. dwell time |
| 4 | 150 | No | −40 | 37.4 | 35.5 | | |
| 5 | 150 | Yes | −40 | 36.2 | 36.8 | | |
| 6 | 150 | No | 25 | | | 40.95 | 41.72 |
| 7 | 150 | Yes | 25 | 43.5 | 44.4 | 42.0 | 40.0 |
| 8 | 110 | Yes | −40 | 34.4 | | | |
| 9 | 110 | No | 25 | 41.4 | 42.3 | 41.4 | 40.25 |
| 10 | 110 | Yes | 25 | | 41.7 | 40.8 | 41.0 |
| 11 | ¹25 | No | 25 | 38.6 | | | |
| 12 | 25 | No | −40 | 27.3 | | | |

¹ Polyethylene kept at room temperature for years.

From this data it is apparent that modified polyethylene enhances the cross-linking efficiency of high energy irradiation. It also appears that neither quenching nor "dwell time" up to 24 hours appreciably affects this improved cross-linking efficiency. The greater part of any change in the physical state appears to occur during the first minute, with only small changes thereafter. The time required for modified polyethylene to reach an equilibrium physical state will vary depending on the particular polyethylene employed and the temperature at which it is allowed to come to equilibrium. Although the change is gradual, equilibrium is generally reached after several days, i.e. modified polyethylene will revert to normal polyethylene after standing several days.

The effect of initial molecular weight on irradiated polyethylene is similar to that described in application, Serial No. 324,552, except that in the modified physical state lower irradiation doses can be used to obtain an equal degree of cross-linking in a particular polyethylene. The properties of irradiated polyethylene described in application, Serial No. 324,552 are also possessed by the products of the instant process except that the irradiated polyethylene products of the instant case should possess the advantage of an even lower ratio of trans-unsaturation to cross-links than was obtained by irradiating normal polyethylene at the same temperature.

These properties make the new materials useful as an insulating tape, and for many other applications which will appear to those skilled in the art. Thus, with the specified polymeric materials irradiated according to this invention, advantage can be taken of their outstanding electrical properties in applications where they have been heretofore unsuccessful because of their inability to withstand elevated temperatures. Also the specified irradiated materials may be employed in applications, such as fluid conduits or containers, where the unirradiated polyethylene could not be used because of the presence of solvents or high temperatures. These products should be more suitable than room temperature-irradiated polyethylenes, particularly when used as conduits or containers for reagents that attack unsaturated chemical bonds. Moreover, by properly adjusting the intensity of the irradiation in relation to the thickness of the material being irradiated, a "case hardening" effect can be obtained, i.e., the exterior portion of an article can be irradiated while the interior remains essentially unirradiated thereby making possible new molding techniques by melting and removing the interior, new variable property articles, etc.

It will be readily realized that other forms of electron accelerating apparatus may be employed instead of high voltage apparatus 1. For example, linear accelerators of the type described by J. C. Slater in the "Reviews of Modern Physics," vol. 20, No. 3, pages 473–518 (July 1948), may be utilized. In general, the energy of the electrons employed in the practice of the invention may range from about 50,000 electron volts to 20 million electron volts or higher, depending upon the depth to which it is desired to affect the polymeric materials. To decrease wasteful energy absorption between the point of exit of electrons from the accelerating apparatus and the polymeric materials, a vacuum chamber having thin entrance and exit windows may be inserted in the space.

Many other sources of high energy, ionizing irradiation besides the electron sources described above can also be used in this invention. Examples of such ionizing radiation sources are gamma rays, such as can be obtained from $Co^{60}$, "burnt" uranium slugs, fission by-products, such as waste solutions, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, α-particles, fission fragments, such as are available from modern cyclotrons, etc.

Thus, one of the effects of the process of irradiating modified polyethylene as carried out in the present invention is that the cross-linking effectiveness of an irradiation dose is greatly enhanced, thus effecting a less costly method of producing cross-linked polyethylene possessing at elevated temperatures improved form stability, increased solvent resistance, and stress cracking properties. Furthermore, irradiating modified polyethylene increases the cross-linking effectiveness of an irradiation dose beyond that expected from temperature alone. In addition, the cross-linking should take place without increasing the number of irradiation-produced trans-unsaturation in the polyethylene, thus producing a polymer that should be less susceptible to agents that affect these reactive unsaturated groups.

What I claim as new and desire to secure by Letters Patent of the United States is:

1. A process which comprises (1) heating polyethylene to the amorphous state, (2) cooling the polyethylene to a temperature range where it is normally crystalline, and (3) while maintained in said temperature range, but no colder than 25° C., irradiating the polyethylene with ionizing radiation having an energy equivalent to at least $5 \times 10^4$ electron volts to a radiation dose in the range of $3 \times 10^6$ to $5 \times 10^8$ REP before equilibrium of the crystalline state of the polyethylene has been established.

2. The product produced in claim 1 which is more highly cross-linked and less swollen in toluene than it would be in the absence of being heated to the amorphous state prior to irradiating.

3. A process which comprises heating polyethylene to about 110° C. and cooling the heated polyethylene below about 60° C. and irradiating the polyethylene at a temperature in the range of 25°–60° C. with ionizing radiation having energy equivalent to at least $5 \times 10^4$ electron volts to a radiation dose in the range of $3 \times 10^6$ to $5 \times 10^8$ REP before equilibrium of the crystalline state of the polyethylene is established.

4. A process of irradiating polyethylene which comprises (1) heating polyethylene to a temperature at which it is amorphous, (2) cooling to below about −45° C., a temperature at which further molecular ordering is reduced to a minimum, (3) warming the polyethylene to about 25° C. and (4) irradiating the modified polyethylene while maintained substantially at a temperature of 25° C. with ionizing radiation having energy equivalent to at least $5 \times 10^4$ electron volts to a radiation dose in the range of $3 \times 10^6$ to $5 \times 10^8$ REP.

5. A process of irradiating polyethylene which comprises (1) heating polyethylene above 110° C., (2) cooling to the temperature of liquid nitrogen, (3) warming the polyethylene to about 25° C. and (4) irradiating the modified polyethylene while maintained at a temperature of substantially 25° C. with ionizing radiation having energy equivalent to at least $5 \times 10^4$ electron volts to a radiation dose in the range of $3 \times 10^6$ to $5 \times 10^8$ REP.

6. The method as in claim 1 wherein high energy electrons are the source of the ionizing radiation.

7. The process as in claim 3 wherein high energy electrons are the source of the ionizing radiation.

8. The process as in claim 4 wherein the high energy electrons are the source of the ionizing radiation.

9. The process as in claim 5 wherein high energy electrons are the source of the ionizing radiation.

10. The process as in claim 6 wherein the electrons have energy in the range of $5 \times 10^4$ to $2 \times 10^7$ electron volts.

11. The process as in claim 7 wherein the electrons have energy in the range of $5 \times 10^4$ to $2 \times 10^7$ electron volts.

12. The process as in claim 8 wherein the electrons have energy in the range of $5 \times 10^4$ to $2 \times 10^7$ electron volts.

13. The process as in claim 9 wherein the electrons have energy in the range of $5 \times 10^4$ to $2 \times 10^7$ electron volts.

References Cited in the file of this patent

UNITED STATES PATENTS

| 1,906,402 | Newton | May 2, 1933 |
|---|---|---|

FOREIGN PATENTS

| 144,291 | Switzerland | May 30, 1927 |
|---|---|---|

OTHER REFERENCES

Sissman et al.: U.S.A.E.C., O.R.N.L. 928, June 29, 1951 (available from AEC, Oak Ridge, Tenn.), pages 9–13, 16, 24, 79–82, 191.

Rollefson et al.: "Annual Review of Physical Chemistry," vol. 3, page 64. Received in Patent Office Library Oct. 20, 1952.

"Science," vol. 113, pp. 718, 719, January-June 1951.

Chapiro: Chemical Abstracts, vol. 44, columns 6192, 6193 (1950).

Glasstone: Sourcebook of Atomic Energy, p. 514 (1950), D. Van Nostrand Co., N. Y. City.